US006895259B1

(12) United States Patent
Blank nee Keller et al.

(10) Patent No.: US 6,895,259 B1
(45) Date of Patent: May 17, 2005

(54) FLAT SCREEN AND MOBILE TELEPHONE WITH FLAT SCREEN

(75) Inventors: Judith Blank nee Keller, Frauenfeld (CH); Rudolf Ritter, Zollikofen (CH)

(73) Assignee: Swisscom Mobile AG, Bern (CH)

( * ) Notice: Subject to any disclaimer, the term of this patent is extended or adjusted under 35 U.S.C. 154(b) by 0 days.

(21) Appl. No.: 09/786,196

(22) PCT Filed: Sep. 2, 1998

(86) PCT No.: PCT/CH98/00376
§ 371 (c)(1),
(2), (4) Date: Mar. 2, 2001

(87) PCT Pub. No.: WO00/14941
PCT Pub. Date: Mar. 16, 2000

(51) Int. Cl.⁷ ............................................. H04M 1/00
(52) U.S. Cl. .................... 455/566; 455/556.1; 359/630; 359/839; 349/33; 349/113
(58) Field of Search ............................. 455/90.3, 344, 455/347, 556.1, 566; 359/630, 839; 349/33, 74, 110, 111, 113; 381/86, 365

(56) References Cited

U.S. PATENT DOCUMENTS

| | | | | |
|---|---|---|---|---|
| 5,566,224 A | * | 10/1996 | ul Azam et al. ............ | 455/566 |
| 5,808,711 A | * | 9/1998 | Suppelsa et al. .............. | 349/74 |
| 5,818,558 A | * | 10/1998 | Ogishima .................... | 349/110 |
| 5,878,353 A | * | 3/1999 | ul Azam et al. ............ | 455/566 |
| 6,106,121 A | * | 8/2000 | Buckley et al. ............. | 359/839 |
| 6,311,077 B1 | * | 10/2001 | Bien ........................ | 455/566 |
| 6,553,123 B1 | * | 4/2003 | Dykstra ....................... | 381/86 |

FOREIGN PATENT DOCUMENTS

| | | | | |
|---|---|---|---|---|
| GB | 2 295 241 | | 5/1996 | |
| GB | 2295241 | * | 5/1996 | ............. G02F/1/15 |
| JP | 0136783 | * | 2/1992 | ............ H04N/7/14 |
| JP | 10108769 | * | 4/1998 | ............ A47G/1/00 |

OTHER PUBLICATIONS

Patent Abstracts of Japan, vol. 098, No. 009, 31. Jul. 1998 & JP 10 108769 A (Almex Inc), 28. Apr. 1998, siehe Zusamenfassung.

Patent Abstracts of Japan, vol. 098, No. 009, 31. Jul. 1998 & JP 10 093674 A (Kokusai Electric Co Ltd), 10. Apr. 1998, siehe Zusammenfassung.

Patent Abstracts of Japan, vol. 010, No. 246 (M–510), Aug. 23, 1986 & JP 61 075033 A (Seiko Epson Corp), 17. Apr. 1986, siehe Zusammenfassung.

* cited by examiner

*Primary Examiner*—William Trost
*Assistant Examiner*—Stephen D'Agosta
(74) *Attorney, Agent, or Firm*—Oblon, Spivak, McClelland, Maier & Neustadt, P.C.

(57) ABSTRACT

A flat display for a mobile radio telephone or another autonomous electrical device, with a display surface on which information can be displayed. The display can be electrically controlled to make the entire display surface, or only a portion thereof, reflecting. Alphanumerical and/or advertising information can be displayed on the remaining, non-reflecting portion of the display surface. The mobile radio telephone can also be used as a practical pocket mirror. Advertisements and important information, for example service provider identifications, can be displayed particularly effectively on a reflecting background.

12 Claims, 2 Drawing Sheets

FLAT SCREEN AND MOBILE TELEPHONE WITH FLAT SCREEN

CROSS-REFERENCE TO RELATED APPLICATIONS

The present application is a national stage filing of International Application PCT/CH98/00376, filed on Sep. 2, 1998, the entire contents of which is incorporated herein by reference.

BACKGROUND OF THE INVENTION

1. Field of the Invention

The present invention relates to a flat display. In particular, the present invention relates to a flat display for an electrically autonomous device, for example a mobile radio telephone.

2. Discussion of the Background

Mobile radio telephones are becoming more and more miniaturized, and therefore can easily be taken along in a pocket or in a handbag. The same also applies for other portable electronic devices, such as, for example, pocket calculators, laptops, palmtops, etc.

Described in the U.S. patent publication U.S. Pat. No. 5,566,224 is a radio-based communications device which is linked to a display on which information can be displayed by the communications device. According to the patent publication U.S. Pat. No. 5,566,224, the display can be brought to show the information in a mirror surface behind a transparent window, or the display can be positioned in such a way that it projects the information on a portion of the mirror surface. Referred to, moreover, in the patent publication U.S. Pat. No. 5,566,224 is the possibility that portions of the mirror surface are controllable from a reflecting into a non-reflecting, transparent state, so that information which is shown on the display, installed behind the mirror surface, are visible on the front side of the mirror surface for the viewer.

BRIEF SUMMARY OF THE INVENTION

It is therefore the object of this invention to provide a mobile radio telephone with other functions, which are made use of again and again also when en route.

According to this invention, this object is achieved through the features of claim 1.

In particular, this object is achieved through a flat display which can be controlled electrically so that the display surface can be made reflecting.

In this way the display of the device can also be used as a practical pocket mirror.

The display can preferably be controlled electrically in order to become reflecting when no information is being shown, in particular in standby mode. In another preferred variant of the invention, also only one portion of the display surface can be made reflecting; information and/or advertisements can be displayed on the remaining portion of the display surface. In this way, the users can be made aware, in an effective way, of important information and in particular of company names and logos of service providers.

BRIEF DESCRIPTION OF THE DRAWINGS

The invention will be better understood with the aid of the description illustrated by the attached figures.

DETAILED DESCRIPTION OF THE INVENTION

Figure 1:
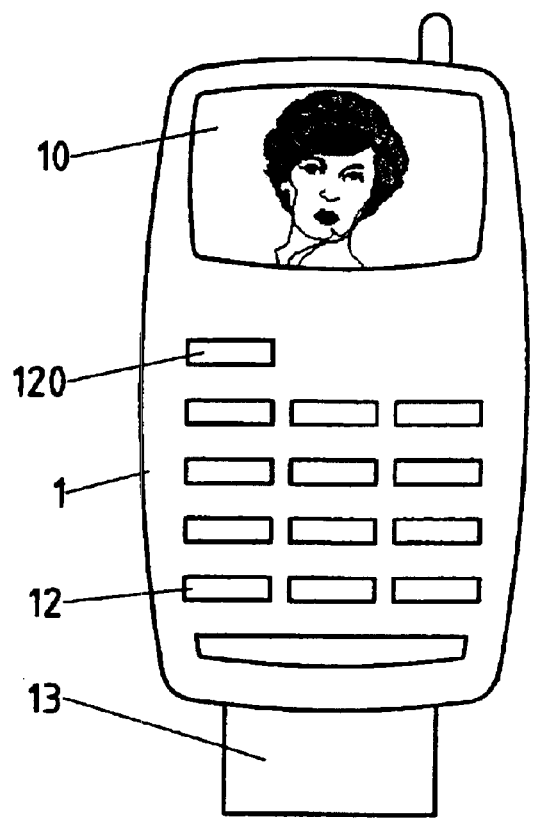
FIG. 1 shows a view from above of a mobile radio telephone with a display according to the invention controlled and used as a mirror.

FIG. 1 shows a mobile radio telephone 1 in standby mode with a display 10 according to the invention. The display 10 according to the invention is controlled electrically by a display driver (not shown) in such a way that it can be used as a reflecting mirror in which the user is reflected. The reflecting or non-reflecting mode of the display 10 can preferably also be selected by the user with an operating element, for example an operating key 120. Other functions of the mobile radio telephone can also be actuated with other operating elements 12. The mobile radio telephone preferably further comprises an identification card 13, for example a SIM (Subscriber Identity Module) card, in order to identify the user in a mobile radio network. The card 13 preferably contains a processor (not shown), which can also control the display 10. The mobile radio telephone, or respectively the identification card, can preferably receive short messages, for example SMS and/or USSD short messages, which are transmitted in the mobile radio network from another terminal, and with which the state of the display can also be controlled.

Figure 2:
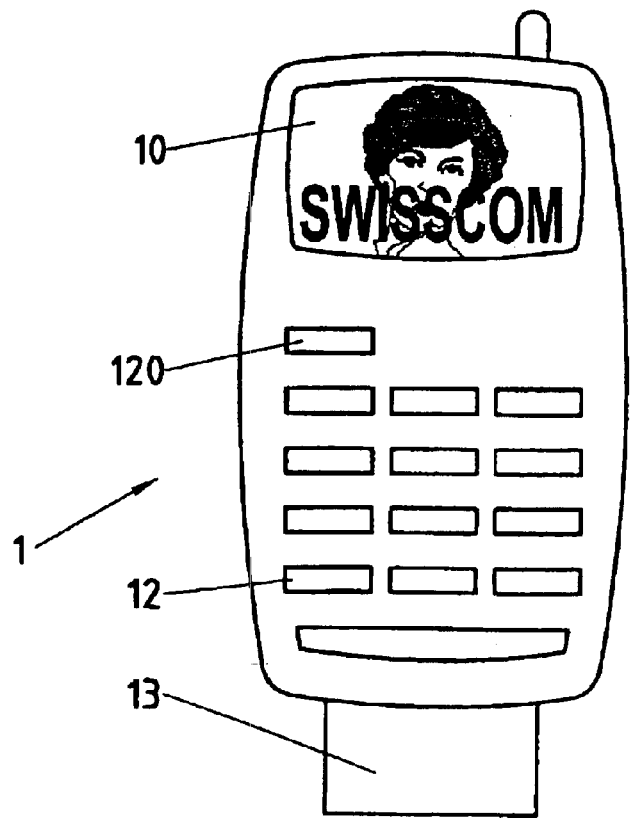
FIG. 2 is a view from above of the same mobile telephone, where, however, one portion of the display is controlled as a mirror while information is being shown on the remaining portion.

FIG. 2 shows the same mobile radio telephone where only one portion of the display 10 is controlled as a mirror, however, while information is being displayed on the remaining portion. The display is controlled in this state, for example, when a message comes in or when the service of an external service provider, for example of a financial institution or of an information vendor, is availed of. Information, for example information about the selected service, in particular an identification of the calling party or respectively of the service provider, for example the call number, the name and/or the logo of this service provider, is shown in this case over the reflecting background.

Figure 3:
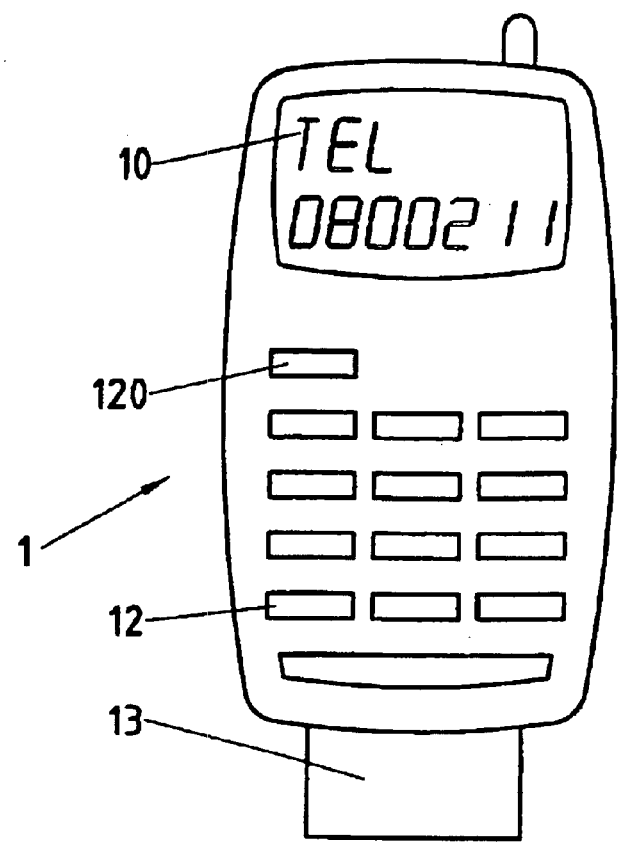
FIG. 3 is a view from above of the same mobile radio telephone, where, however, information is being shown on the entire display.

FIG. 3 shows the same mobile radio telephone in a state where the entire surface of the display 10 is used for display of information.

Figure 4:
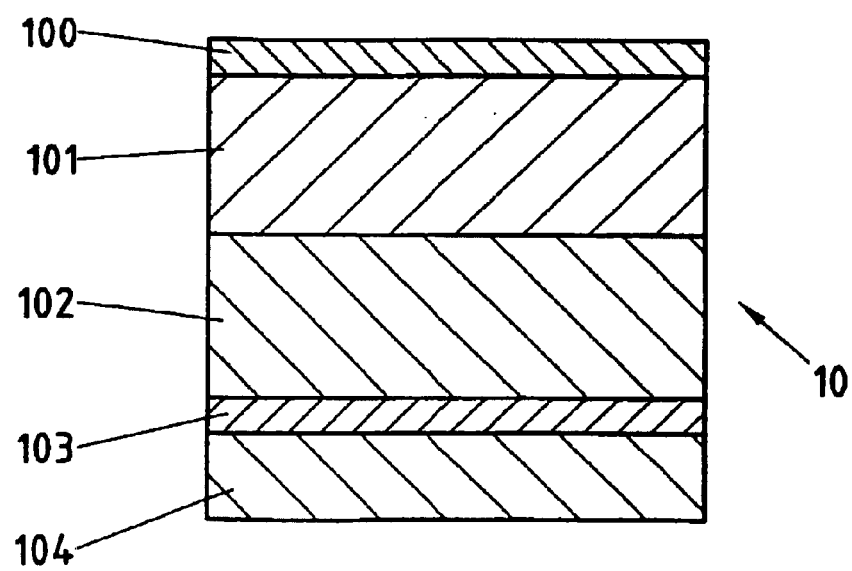
FIG. 4 is a very much enlarged section of a display according to the invention.

FIG. 4 shows a section of a display according to the invention. The display 10 comprises a transparent outer layer 100 of non-reflecting glass or synthetic material, a foreground display layer 101 under the upper layer 100 with a first liquid crystal element, a background display layer 102 under the layer 101 with a second liquid crystal element, a reflecting layer 103 under the layer 102 and a substrate 104 under the reflecting layer 103.

The foreground display layer 101 comprises a conventional matrix display, for example a passive or active liquid crystal element. The layer 101 is preferably constructed as a matrix display so that each pixel can be individually controlled. If a first set of voltages is applied by the display driver (not shown) to the electrodes (not shown) which control a pixel, this pixel takes on a first color, preferably black; if a second set of voltages is applied, preferably when zero voltages are applied, this pixel becomes transparent so that the viewer can see the background layers 102 or 103. In a variant, the pixels can take on another color or different levels of gray or shades of color instead of, or in addition to, black.

The background display layer 102 comprises a conventional matrix display, for example a passive or active liquid crystal element, which can be changed electrically from a transparent state into another colored state, for example into a white state. The layer 102 is preferably constructed as a matrix display so that each pixel can be controlled to be transparent or white individually. The layer 102 is preferably transparent when no voltage is being applied to the electrodes. In a variant, the pixels can take on another color or different levels of gray or shades of color instead of, or in addition to, white.

One skilled in the art will understand that the two display layers 101 and 102, depending upon the liquid crystal technology applied, can consist of several different layers, including, for example, several electrode layers, glass layers, liquid crystal layers, possibly polarization layers, etc.

The layer 103 is made up, for example, of an aluminum film or of another reflecting metal, and reflects the light outwardly. The inner layer 104 is a substrate, for example of metal or synthetic material, in order to make the entire display more robust. The layers 103 and 104 can also be made of synthetic material, for example if the display has to be flexible.

Information, for example text and/or pictures, are shown preferably in black with the layer 101 over a white background 102, as illustrated in FIG. 3. When, however, the display layer 102 is transparent, information can be shown in black over a reflecting background, as shown in FIG. 2. When both layers 101 and 102 are transparent, preferably when no voltage is being applied, the viewer sees only the reflecting aluminum layer 103, in which he can be reflected.

One skilled in the art will understand that the display according to the invention does not have to be achieved with liquid crystal displays, but that other types of flat matrix display technologies can also be applied within the framework of this invention. More than two display layers 101 and 102 can also be used in order to make possible colored displays or more complex illustrations, for example. The number of pixels in each layer can be very different, depending upon the application, for example between 30×30 to 1000×1280 pixels. It is also possible within the framework of this invention to use a background display layer 102 which is not controlled as a matrix; in this case the entire layer is either colored (white) or transparent. The size and shape of the various layers can be different for certain applications so that, for example, only one portion of the display can be made reflecting. Depending upon applied technology, each pixel of the background display layer 102 can be changed from a second colored state —for example white—into a reflecting state; in this case, the reflecting layer 103 becomes unnecessary. The display 10, in particular the reflecting layer 103, can also be concave or convex in order to control the reflection angle.

The present invention makes it possible to use mobile devices with a display also as practical pocket mirrors. Moreover the device is given an unusual and exclusive design. Finally, users can be made aware of important or advertising information in a very effective way in that this information is displayed over a reflecting background.

What is claimed is:

1. A flat display for an electrically autonomous device on which information is displayable and which is electrically controllable to become reflecting, comprising:

a background display layer assembly configured to be selectively changeable between a reflecting state and a colored, non-reflecting state based on electrical control signals, the background display layer assembly including, a background display layer configured to be selectively changeable between a transparent state and a colored state based on the electrical control signals, and a reflecting layer; and a foreground display layer disposed over the background display layer and configured to be selectively changeable between a transparent state and a non-transparent state based on other electrical control signals, wherein, the flat display is configured to receive at least one of the electrical control signals and the other electrical control signals from an identification card, and a reflecting state of the flat display is remotely controllable.

2. The flat display according to claim 1, wherein the flat display is electrically controllable so that only a portion of said display becomes reflecting.

3. The flat display according to claim 2, wherein at least one of text information and picture information is displayable on a remaining, non-reflecting portion of the display.

4. The flat display according to claim 1, wherein the reflecting layer is concave or convex.

5. The flat display according to claim 1, wherein said foreground display layer includes a liquid crystal display.

6. The flat display according to claim 1, wherein said background display layer includes a liquid crystal display.

7. The flat display according to claim 1, wherein said reflecting layer includes a film made of aluminum.

8. A mobile radio telephone comprising:

a flat display including, a background display layer configured to be selectively changeable between a reflecting state and a colored, non-reflecting state based on electrical control signals, the background display layer including, a display layer configured to be selectively changeable between a transparent state and a colored state with the electrical control signals, and a reflecting layer, and a foreground display layer disposed over the background display and configured to be selectively changeable between a transparent state and a non-transparent state based on other electrical control signals; and an identification card configured to control a reflecting state of the flat display, wherein the reflecting state of the flat display is remotely controllable.

9. The mobile radio telephone according to claim 8, wherein the identification card includes an integrated processor configured to control the reflecting state of the flat display.

10. The mobile radio telephone according to claim 8, wherein the reflecting state of the flat display is remotely controllable by data messages.

11. The mobile radio telephone according to claim 8, further comprising:

operating elements configured to control a reflecting state or a non-reflecting state of the display.

12. The mobile radio telephone according to claim 8, wherein the flat display is configured to be reflecting when the mobile radio telephone is switched off.

* * * * *